J. R. ARMSTRONG.
GAS METER.
APPLICATION FILED SEPT. 16, 1912.
1,062,268.
Patented May 20, 1913.
2 SHEETS—SHEET 1.
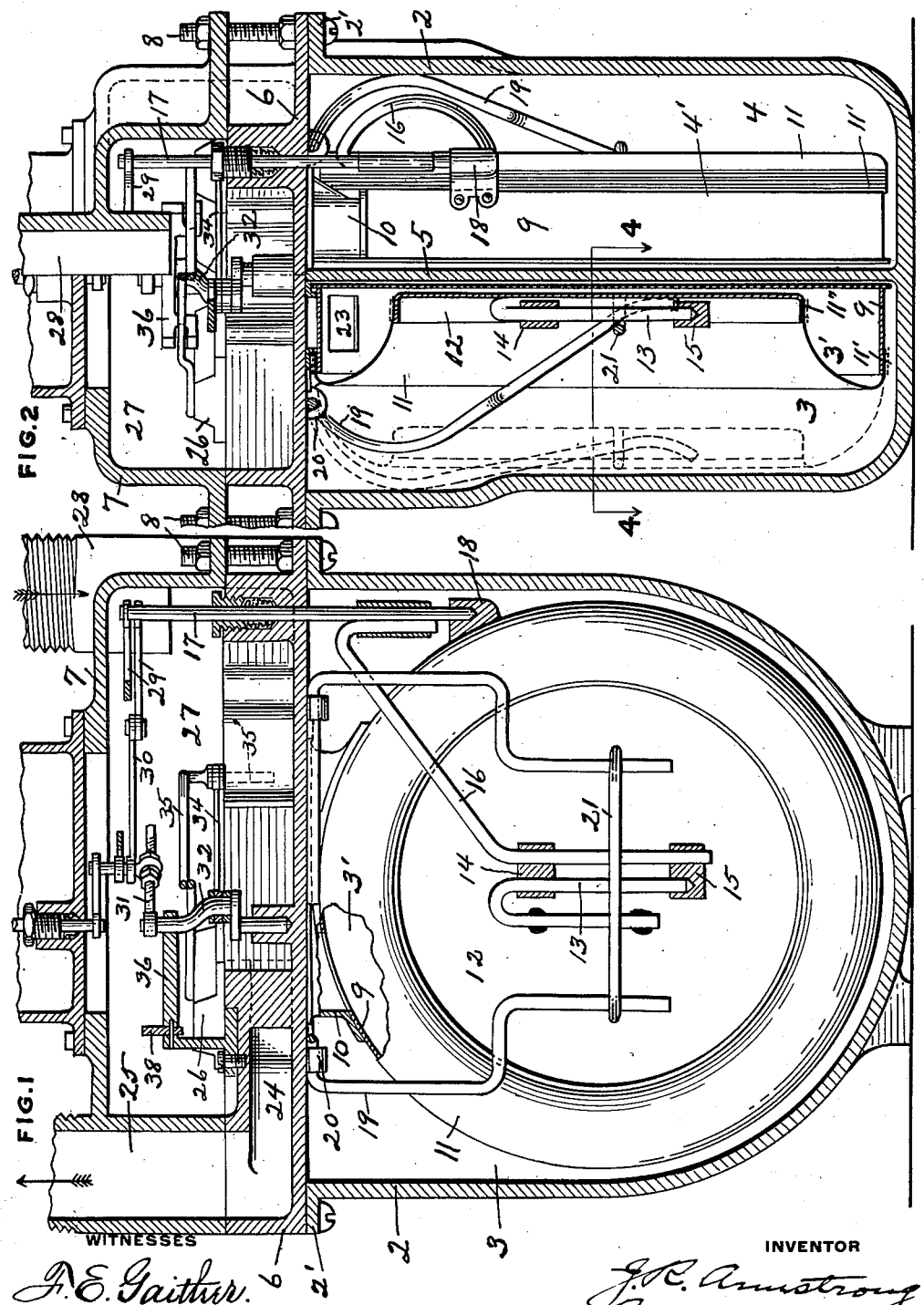
WITNESSES
F. E. Gaither.
Ella McConnell
INVENTOR
J. R. Armstrong

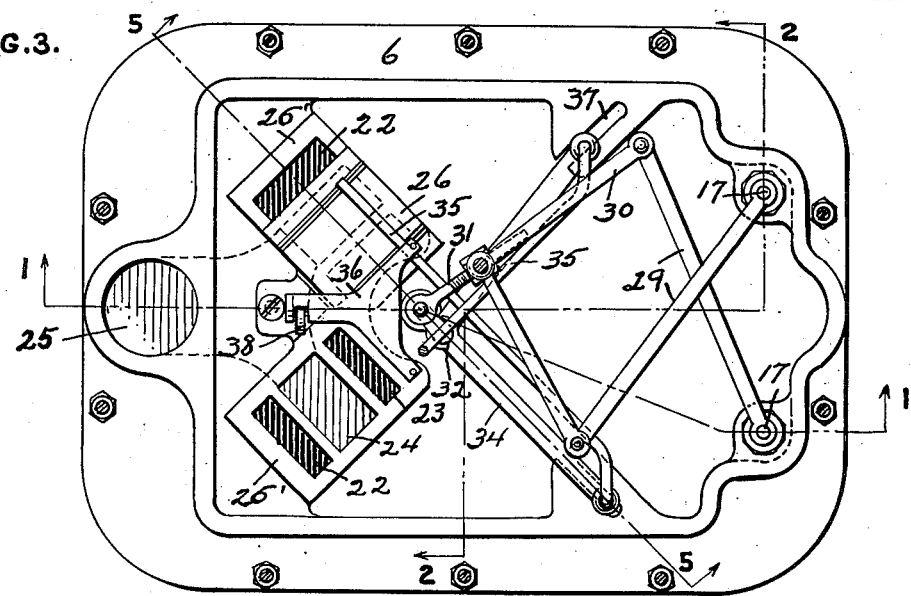
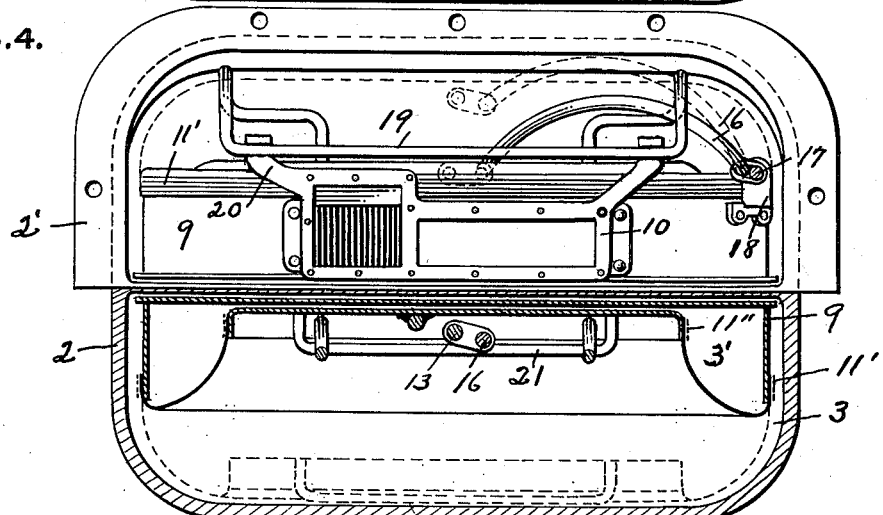
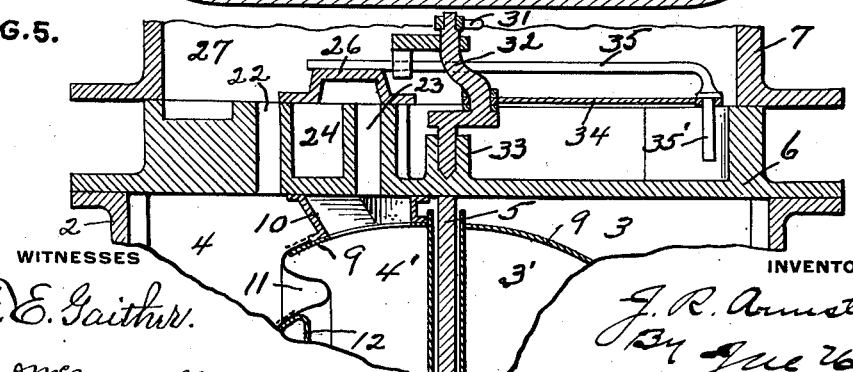

UNITED STATES PATENT OFFICE.

JAMES R. ARMSTRONG, OF PITTSBURGH, PENNSYLVANIA, ASSIGNOR OF ONE-THIRD TO WILLIAM H. IRVIN, OF PITTSBURGH, PENNSYLVANIA.

GAS-METER.

1,062,268.　　　　　Specification of Letters Patent.　　Patented May 20, 1913.

Application filed September 16, 1912.　Serial No. 720,499.

*To all whom it may concern:*

Be it known that I, JAMES R. ARMSTRONG, a resident of Pittsburgh, in the county of Allegheny and State of Pennsylvania, have invented certain new and useful Improvements in Gas-Meters, of which the following is a specification.

This invention relates to gas meters, and has particular reference to certain improvements in the meter patented to me May 9, 1911, No. 991,927.

One object is to provide a construction whereby the parts may be assembled and adjusted before they are inclosed in the meter casing.

A further purpose is to simplify the construction, particularly with reference to that portion of the structure provided with the inlet and outlet ports, in the improved adaptation the ports, the valves, and the valve actuating mechanism being carried by a head-like body which forms a closure for an open-top casing containing the measuring chambers.

In the accompanying drawings, Figure 1 is a vertical longitudinal section of the improved meter, taken on line 1—1 of Fig. 3, and Fig. 2 is a vertical cross section on line 2—2 of Fig. 3. Fig. 3 is a top plan with the cap-like inclosing casing removed. In Fig. 4 one-half of the meter is shown in plan at the top of the chamber-forming casing, and the other half is a sectional plan on line 4—4 of Fig. 2. Fig. 5 is a section of the upper portion of the meter taken on line 5—5 of Fig. 3.

The invention is here shown embodied in a meter of double form, there being two pairs of measuring chambers with one chamber of each pair filling, while the other two chambers are emptying. But it will be understood that the improvements are applicable to a meter of single form, i. e., one equipped with only one pair of measuring chambers.

Referring to the drawings, 2 designates an open-top casing which is divided into two chambers 3 and 4 by the central partition 5. The open-top of the casing is flanged at 2' and faced to receive the head-like body 6 which closes chambers 3 and 4, body 6 and the upper cap-like casing 7 being secured to flanges 2' by bolts 8.

The arrangement is such that body 6 carries practically all of the operating mechanism, including the supplemental measuring chambers 3' and 4' located in the main chambers 3 and 4, respectively. Each of the supplemental chambers consists of a casing 9 open at one side and secured to the underside of body 6 by a flanged neck-like part 10. The two casings 9 are arranged back to back and separated sufficiently to enter casing 2 at opposite sides of partition 5, so that when head 6 is in place a supplemental measuring chamber is installed within each main measuring chamber, being supported entirely by head 6 and removable therewith.

The open side of each chamber-forming casing 9 is closed by a flexible diaphragm 11 carrying the usual head-forming pan 12, the diaphragm being secured to the casing and pan by wrapping 11' and 11", respectively. Secured to each pan is a vertical spindle 13 which extends through guide 14 downwardly to a bearing 15, the guide and bearing being carried by arm 16 of irregular shape secured to flag rod 17, the latter having a bearing 18 on casing 9 and extending upwardly through head 6, as will presently be described. The diaphragm is prevented from oscillating on arm 16 by the swinging guide 19 depending from the bearings 20 projecting from neck 10, the guide arms extending downwardly through loop 21 secured to pan 12.

Head 6 is formed with two sets of ports, one set for each pair of measuring chambers. Each set includes two inlet ports 22 and 23 which establish communication between the space inclosed by cap 7 and the measuring chambers, port 22 communicating with the main measuring chamber 3 (or 4) and port 23 with the supplemental chamber 3' (or 4'). Located between inlet ports 22 and 23 is the outlet port 24 which leads to the meter outlet 25, as shown in dotted lines in Fig. 3, also see Fig. 1. The three ports 22, 23 and 24 open through a valve seat 26' which is faced to receive slide valve 26. In Fig. 3 only one of the two slide valves is shown; the other being removed to fully illustrate the valve seat and ports. 27 indicates the gas receiving chamber inclosed by cap 7 and to which gas is admitted through inlet connection 28.

The mechanism for transmitting motion from flag rods 17 to the valves is the same as in my above mentioned patent and consists of arms 29 secured to the rods and crossing each other with their outer ends adjustably connected by links 30 with screw stem 31 on the upper end of the double crank 32, the latter mounted in step bearing 33 carried by head 6. Extending from cranks 32 are arms 34, each of which is secured to a rod 35 fastened to valve 26 and movable through the bridge-like guide 36. The extremity of each rod 35 is extended downwardly at 35' and moves in slot 37 formed in head 6, Figs. 3 and 4, thereby positively directing the movement of the valve. The valve actuating mechanism operates as in my former patent to which reference may be made for detailed description.

When assembling the meter, the supplemental chambers are mounted on head 6, the faced neck portions 10 being secured thereto as will be understood, with the swinging guides 19 confined in the hook arms 20. The valves and the valve actuating mechanisms are mounted on head 6 and placed in proper adjustment before the head is positioned on casing 2. Pivoted latch 38 carried by bridge 36 permits screw stem 31 to rotate in one direction, but prevents the meter from running backward, this attachment being the same as in the patented structure excepting for a slight difference in its location.

I claim:—

1. In a gas meter, the combination of an open-top main chamber, a supplemental chamber within the main chamber and provided with a flexible wall, a body constituting a closure for the main chamber and ported to admit gas to the latter and to the supplemental chamber and also provided with an outlet port, a valve for the ports, and actuating means for said valve mounted on the body and operatively connected to the flexible wall of the supplemental chamber.

2. In a gas meter, the combination of an open-top main chamber, a body constituting a closure for the chamber, a supplemental chamber carried by the body and extending into the main chamber and provided with a flexible wall, the body being ported to admit gas to both chambers and also provided with an outlet port, a valve for the ports, and actuating means for said valve operatively connected to the flexible wall of the supplemental chamber.

3. In a gas meter, the combination of an open-top chamber, a body forming a closure therefor, a casing open on one side and secured to the body and depending into the chamber, a flexible diaphragm secured to the casing and closing the open side thereof, the body being ported to admit gas to the casing and to the chamber and also provided with an outlet port, a valve for the ports, and actuating means for said valve operatively connected to the flexible diaphragm and to the valve.

4. In a gas meter, the combination of an open-top main chamber, a body constituting a closure for the chamber, a supplemental chamber secured to the body and depending into the main chamber, the supplemental chamber consisting of a casing having one side closed by a flexible wall, the body being ported to admit gas to each of said chambers and also provided with an outlet port, a valve for the ports, a flag rod mounted on the body and extending into the main chamber and operatively connected to the flexible wall of the supplemental chamber, and means connecting the flag rod and valve.

5. In a gas meter, the combination of a casing partitioned to form two open-top main chambers, a body fitting the casing and closing each of said chambers, two supplemental chambers—one within each main chamber and having one side closed with a flexible wall, the body being formed with two sets of ports, each set consisting of two inlet ports and an outlet port with the inlet ports communicating with the main chamber and with the supplemental chamber located therein, a valve for each set of ports, and actuating mechanisms for said valves operatively connected to the movable walls of the supplemental chambers.

6. In a gas meter, the combination of a casing partitioned to form two open-top main chambers, a body fitting the casing and closing each of said chambers, two supplemental chambers secured to the underside of the body and spaced apart to enter the main chambers on opposite sides of the casing partition, each supplemental chamber having a flexible wall, the body being formed with two sets of ports, each set consisting of two inlet ports and an outlet port with the inlet ports of each set communicating with one of the main chambers and with the supplemental chamber located therein, a valve for each set of ports, and actuating mechanisms for said valves operatively connected to the movable walls of the supplemental chambers.

7. The combination of an open-top main chamber, a body forming a closure therefor, a supplemental chamber secured to and depending from the body into the main chamber, a wall of the supplemental chamber consisting of a flexible diaphragm, a guide for the diaphragm held in place on the supplemental chamber by the body, the body being ported to admit gas to the main and supplemental chambers and also provided with an outlet port, a valve for the ports, and valve actuating means operatively connected to the flexible diaphragm and to the valve.

8. In a gas meter, the combination of an open-top main chamber, a body forming a closure for the chamber, a supplemental chamber consisting of a casing having its upper surface fitting and secured to the under side of the body, one side of the supplemental chamber being closed by a flexible diaphragm, the body being ported to admit gas to the main and supplemental chambers and also provided with an outlet port, a valve for the ports, and valve actuating means operatively connected to the flexible diaphragm and to the valve.

9. In a gas meter, the combination of an open top main chamber, a supplemental chamber within the main chamber and provided with a flexible wall, a body constituting a closure for the main chamber, the body being ported to communicate with the main and supplemental chambers, a valve for the ports, and actuating means for said valve carried by the body with the said operating means operatively connected to said flexible wall.

10. In a gas meter, the combination of a casing partitioned to form two open-top main chambers, a body constituting a closure for said chambers, two supplemental chambers—one within each main chamber and having one side closed with a flexible wall, the body being ported to communicate with each of said chambers, valves for the ports, and actuating means for said valves operatively connected to the movable walls of the supplemental chambers.

In testimony whereof I affix my signature in presence of two witnesses.

JAMES R. ARMSTRONG.

Witnesses:
J. M. NESBIT,
ELLA McCONNELL.